Oct. 13, 1942. L. J. MEYER 2,298,497
NUT SHELLING MACHINE
Filed Jan. 27, 1940 2 Sheets-Sheet 2
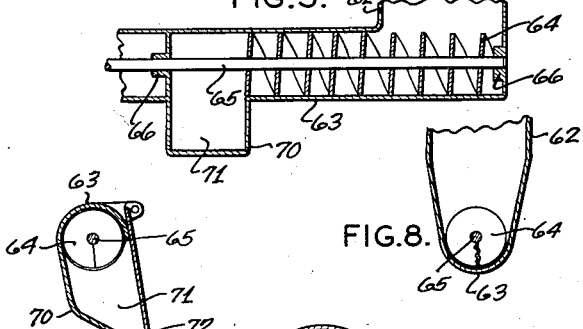
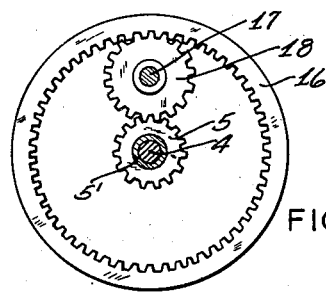
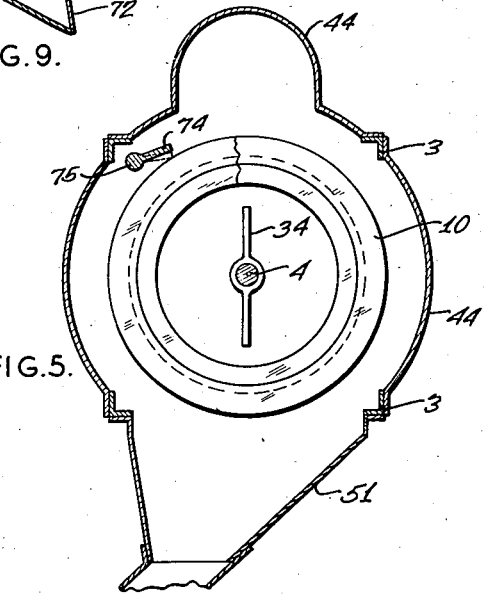
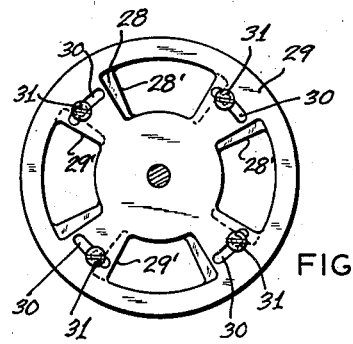
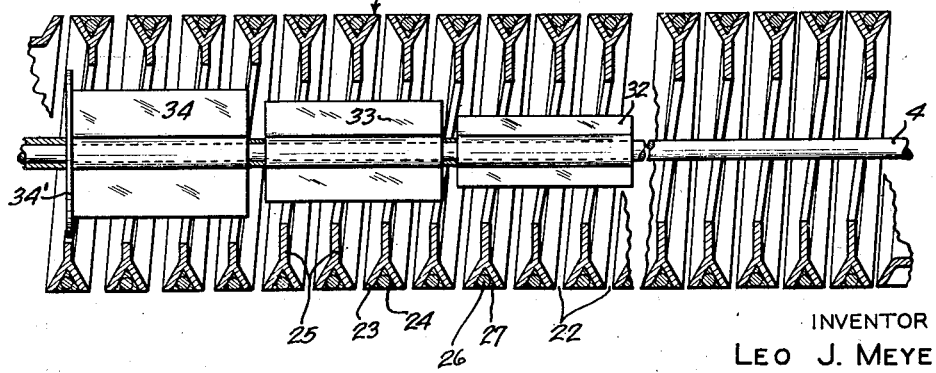
INVENTOR
LEO J. MEYER
BY Ern Harrington
ATTORNEY Patented Oct. 13, 1942

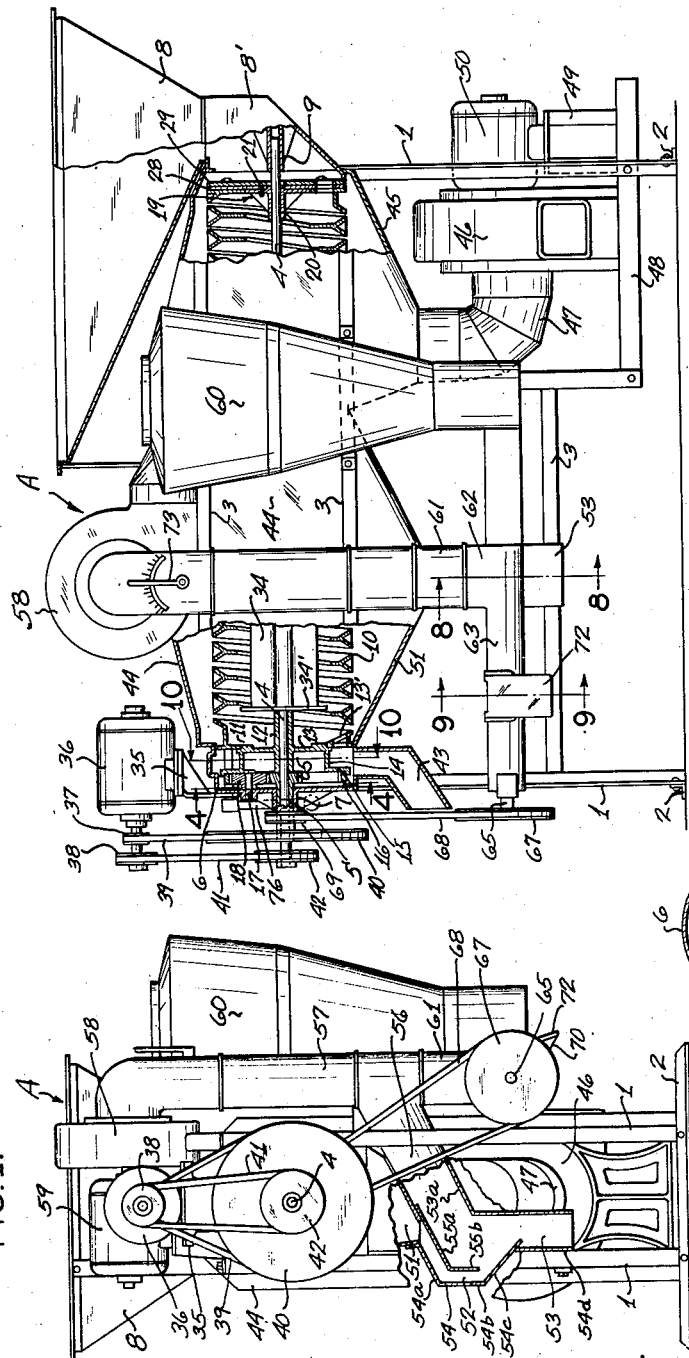

2,298,497

UNITED STATES PATENT OFFICE 2,298,497

NUT SHELLING MACHINE

Leo J. Meyer, San Antonio, Tex., assignor to The Champion Pecan Machine Company, San Antonio, Tex., a corporation of Texas Application January 27, 1940, Serial No. 315,910

4 Claims. (Cl. 209—396)

This invention relates generally to shelling machines adapted for use in removing from the meats of edible nuts, the shells of which have been previously cracked, fragments of shells which adhere thereto, the predominant object of the invention being to provide a machine of the type mentioned which, because of its improved construction and arrangement, is capable of performing its intended function in a highly efficient manner.

As is well known to persons familiar with such matters servicing of edible nuts for sale of the shelled meats thereof, includes the operation of cracking the shells of the nuts usually with the aid of machines provided for this purpose. In cracking nuts with the aid of the machines referred to the shells of the nuts are shattered, but usually fragments of the shells of the nuts adhere to the meats of the nuts after the shell-cracking operations.

The function of the machine of the present invention is to receive nuts after their shells have been cracked and operate on the cracked nuts in such manner that all shell fragments are removed from the meats of the nuts so that when the meats of the nuts are discharged from the machine they are free from adhering particles of shells. This function of the improved machine disclosed herein is performed in an improved and unique manner, and additionally the improved machine includes means for separating and conducting away from the nut meats larger and smaller shell particles, and fine shell particles and shell dust which accompany the nuts into the machine or are produced as the result of operation of the shelling machine.

Fig. 1 is an end elevation of the improved shelling machine, a portion thereof being shown in section.

Fig. 2 is a view of the improved shelling machine showing same partly in side elevation and partly in vertical section.

Fig. 3 is a fragmentary vertical section showing the means for discharging from the machine larger shell fragments.

Fig. 4 is an enlarged fragmentary section taken on line 4—4 of Fig. 2.

Fig. 5 is an enlarged, vertical section taken through the machine.

Fig. 6 is an end elevation of the drum of the machine illustrating the manner of regulating the volume of the flow of nuts into said drum.

Fig. 7 is a fragmentary longitudinal section of the drum of the machine and illustrating the paddles arranged therein.

Fig. 8 is an enlarged section taken on line 8—8 of Fig. 2.

Fig. 9 is an enlarged section taken on line 9—9 of Fig. 2.

Fig. 10 is an enlarged section taken on line 10—10 of Fig. 2.

In the drawings, wherein is shown for the purpose of illustration, merely, one embodiment of the invention, A designates the improved shelling machine generally. The machine A includes a frame that includes a pair of opposed end members 1, each of which has fixed thereto at its bottom an angle bar 2 which provides a support for the end member that rests upon a floor, or other supporting means, by which the machine is supported. The end members are tied together by a plurality of suitable members 3 which extend longitudinally of the machine and combine with the end members to provide the frame of the machine.

Extended longitudinally of the machine is the main shaft 4 of the machine on which is mounted at an end of the machine for rotation with respect to the shaft 4 a pinion 5 which is provided with an elongated hub portion 5'. At the end of the machine at which the pinion 5 is located a housing 6 is provided which encloses the pinion 5 and parts associated therewith, which will be hereinafter described, and this housing 6 includes in its structure a bearing 7, the elongated hub portion of the pinion 5 and the shaft 4 being extended through said bearing portion and being supported thereby for relative rotary motion. The housing 6 is suitably secured to the end member 1 located adjacent thereto and to the longitudinal frame members 3, whereby the main shaft 4 is supported by the frame of the machine for rotary movement and the pinion 5 is supported by the main shaft for rotary motion with respect thereto.

At the end of the machine A opposite to the end thereof at which the housing 6 is located, the machine includes a hopper 8 that includes a lower portion 8' which has formed therein a bearing 9. The bearing 9 of the hopper portion 8' receives and supports therein for rotary motion the adjacent end portion of the main shaft 4 as shown in Fig. 2, the hopper 8 and its associated lower portion 8' being suitably secured to the adjacent end member 1 of the frame of the machine so that this end also of the main shaft 4 is supported for rotation by the frame of the machine.

Supported by the main shaft 4 of the machine A is a drum 10 which at one of its ends is provided with an end element 11 that includes a bearing portion 12 which embraces and is supported by the main shaft so that said bearing portion 12 may rotate relative to said main shaft. The end element 11 includes also a wall 13 in which an aperture 13' is formed, and extending from said wall 13 in the direction of the length of the machine is an integral, annular wall 14. Additionally the end element 11 includes an outwardly extended wall 15 of circular formation which is formed integral with the annular wall 14 and this wall 15 has suitably fixed thereto a ring gear 16, the teeth of said ring gear being alined vertically with the teeth of the pinion 5. Mounted for rotation on a stud shaft 17 which is supported by the housing 6 is an intermediate gear 18, the teeth of which mesh with the teeth of the pinion 5 and the teeth of the ring gear 16 as shown in Fig. 4. At the opposite end of the machine A the drum 10 includes a bearing member 19 which comprises a bearing portion 20 that embraces and is supported by the main shaft 4 for rotary movement with respect thereto, and a circular wall 21 which extends outwardly from an end portion of said bearing portion 20.

The body of the drum 10 is interposed between the end element 11 and the bearing member 19, said body of the drum being fixedly secured at one end to said end element 11 and at its opposite end to said bearing member 19. The body of the drum 10 is of spiral formation, said drum body having formed therein a slot 22 which is located at the circumferential face of the drum body and extends spirally from end to end of the drum body. It is important to note that the spiral slot 22 is not of constant width throughout the length of the drum body, but, instead said spiral slot at the hopper end of the drum body is relatively narrow and becomes progressively wider as the opposite end of the drum body is approached. Also, with respect to the portions of the drum body between the adjacent turns of the spiral slot, it is to be noted that these portions are parts of a continuous spiral section 23 which is provided at its outer face with a spirally extended V-shaped recess 24, the wider end of which is presented at the circumferential face of the drum body, and an inwardly projected web 25 which is extended spirally throughout the length of the drum body. Preferably the spirally extended, V-shaped recess 24 has wound therethrough, throughout the length of the drum body, an ordinary hemp rope 26 or the like, and the V-shaped recess is filled throughout its length with a suitable plastic material 27 which hardens after being arranged in the recess. The hardened material 27 in the recess 24 provides the drum body with a substantially smooth surface, except for the spiral slot 22, and the rope 26 anchors said hardened material in place in the spiral recess 24.

At the hopper-end of the drum 10 a plate 28 is secured thereto which is provided with a plurality of openings 28' formed therethrough. Arranged in cooperative relation with respect to the plate 28 is a similar plate 29 which has formed therethrough openings 29' which are similar in location, shape and dimensions to the openings 28' of the plate 28. The associated plates 28 and 29 are provided with centrally located apertures through which the main shaft 4 of the machine extends, and the plate 29 is provided with a plurality of arcuate slots 30. Extended through each of the arcuate slots 30 of the plate 29 is a screw 31 which is seated at its inner end in a screw-threaded aperture formed in the plate 28, the heads of the screws 31 being adapted to be screwed into gripping contact with the portions of the plate 29 adjacent to the arcuate slots 30 to retain the plate 29 in fixed relation with respect to the plate 28. As will presently appear herein, the associated openings 28' and 29' of the plates 28 and 29 provide inlet openings through which nuts pass from the hopper 8 into the interior of the drum 10, and by unscrewing the screws 31 and adjusting the plate 29 with respect to the plate 28 and then resetting the screws, the effective size of the openings through which the nuts pass into the interior of the drum may be regulated to control the flow of nuts into the drum.

Mounted on the main shaft 4 of the machine A for rotation therewith is a plurality of paddles, said paddles being designated, respectively, by the reference characters 32, 33, and 34. The paddles are constructed as shown to the best advantage in Figs. 5 and 7; that is to say each paddle includes a hub portion from which wing portions are extended in opposite directions. It will be noted from Fig. 7 that the wings of the paddle 33 are of greater width than are the wings of the paddle 32, and that the wings of the paddle 34 are of greater width than the wings of said paddle 33. The reason for this arrangement will be hereinafter explained.

At the end of the machine opposite to the hopper-end thereof a bracket 35 is secured to the housing 6 and extends upwardly therefrom. This bracket supports an electric motor 36 on the power shaft of which a pair of pulleys 37 and 38 are fixedly mounted. Operating over the pulley 37 is a transmission belt 39 which operates also over a larger pulley 40 which is fixedly mounted on the elongated hub portion 5' of the pinion 5, and operating over the pulley 38 is a transmission belt 41 which operates also over a pulley 42 which is fixedly mounted on the main shaft 4 of the machine. In view of the belt and pulley arrangement described above it is obvious that operation of the electric motor 36 will subject the main shaft of the machine to rotary movement. Also, such operation of said electric motor 36 will subject the drum 10 to rotary movement with respect to the main shaft and in the opposite direction to the direction of rotation of said main shaft due to the fact that motion is transmitted to the drum through the intermediate gear 18.

At the end of the machine at which the housing 6 is located a chute 43 is provided which communicates with the lower portion of said housing and is a fixed continuation thereof. This chute serves as a discharge means for certain nuts which for some reason, pass through the machine without being properly shelled thereby. The complete function of the chute 43 will be described later herein when the operation of the machine is described.

The drum 10 is enclosed within a housing 44 which is supported and maintained in place by the frame of the machine, and disposed beneath said housing and arranged in communication with the interior thereof is a discharge chute 45. The discharge chute is located beneath a portion of the drum which is located adjacent to the hopper 8, and leading from the lower end of the discharge chute 45, and communicating with the housing of a suction fan 46, is a conduit 47. The suction fan 46 is supported by a frame 48 which is secured to the frame of the machine.

and mounted on a bracket 49 supported by the frame 48 is an electric motor 50 which actuates said suction fan 46.

Also located beneath the housing 44, and in communication therewith, is a second discharge chute 51 which communicates with a discharge passageway 52 located within a conduit structure 53 which serves as a combined discharge conduit and air duct. In other words, the conduit structure 53, as shown in Fig. 1, includes the wall 54 which is attached to the lower portion of the discharge chute 51, said wall including an angular wall portion 54a, a vertical wall portion 54b, an angular wall portion 54c, and a vertical wall portion 54d. Also the wall which provides the inner wall of the discharge passageway 52 comprises an angularly disposed wall portion 55a which is attached to the discharge chute 51 and is disposed substantially parallel with respect to the wall portion 54a, and a vertical wall portion 55b which is disposed substantially parallel with respect to the vertical wall portion 54b of the conduit structure. Additionally the conduit structure 53 includes an inclined wall portion 53a, which is disposed in substantial parallelism relative to the wall portion 55a, and a substantially vertical wall portion which is substantially parallel with respect to the wall portion 54d. The wall portion 53a, in combination with the wall 55a of the discharge chute and suitable side walls, provides an air duct 56 which communicates with a vertically disposed air conduit 57. The air conduit 57 communicates at its upper end with the housing of a suction fan 58 which is actuated by a suitably supported electric fan 59. The suction fan 58 is provided with a discharge conduit that leads to a suitable dust collector 60 which serves in a well known manner to separate dust and fine shell particles from air discharged into said dust collector by the suction fan 58.

Arranged in communication with the lower end of the air conduit 57 by the conduit section 61 is a member 62 which includes a cylindrical portion 63 in which a screw conveyor 64 is arranged (see Fig. 3). The screw conveyor 64 is mounted on a shaft 65 which is supported for rotation in suitable bearings 66, said shaft 65 having fixedly mounted thereon at its outer end a pulley 67 and being rotated by a transmission belt 68 which operates over said pulley 67 and a pulley 69 fixedly mounted on the elongated hub portion of the pinion 5. The member 62 is provided with a downwardly extending housing 70 which provides a chamber 71 adapted to receive fragments of nut shells conducted to said chamber by the screw conveyor 64, said chamber being normally closed by a cover element 72 whose upper portion is pivotally attached to portions of the housing 70 and whose lower portion is free to move to open and closed positions with respect to said housing 70.

In the operation of the machine disclosed herein nuts which have been previously cracked are introduced into the hopper 8 and these nuts feed through the openings 28'—29' of the plates 28 and 29 into the interior of the drum 10, the plate 29 having been adjusted to provide openings of the proper size to permit the desired flow of nuts into the interior of the drum. During operation of the machine the drum 10 is rotated by the electric motor 36 and as a result thereof the cracked nuts within the drum are repeatedly carried upwardly by wall portions of the drum and drop downwardly when they reach the upper portion of the drum, the nuts being carried longitudinally of the drum during such operation thereon by the spiral portion of the drum. Because of the agitation to which the nuts are subjected within the drum adhering shell particles are knocked therefrom and the smaller shell particles and shell dust are drawn from the entering portion of the drum through the spiral slot 22 by suction created in the discharge chute 45 and conduit 47 by the suction fan 46.

The unshelled nuts, shelled meats, and the shell particles which are too large to pass through the narrower spiral slot in the entering portion of the drum, are carried toward the opposite end of the drum by the spiral portions of said drum, the shelled meats and shell particles passing from the drum into the discharge chute 51 as soon as they meet wider portions of the spiral slot 22 of the drum which will allow their passage therethrough. As the location of the paddle 32 is approached the spiral slot 22 in the drum is wide enough to permit all shelled meats and all large shell fragments to pass therethrough into the discharge chute 51. However, there may still be some unshelled nuts, or meats having rather large shell fragments adhering thereto, within the drum, which are too large to pass through the wider portion of the spiral slot 22 of the drum when the location of the paddle 32 is reached. These unshelled nuts, or meats with large shell fragments adhering thereto, are carried upwardly by the rotating drum and are dropped into the path of the rotating wings of the paddle 32 so as to be struck by said wings. If, upon being struck by the wings of the paddle 32 the meats are separated from the shell fragments, the meats and shell fragments fall through the spiral slot 22 of the drum into the discharge chute 51, but those meats and shell fragments which are not so separated pass on to be dropped and struck by the wings of the paddle 33, and then by the wings of the paddle 34, if that is necessary.

It has been found in the operation of the improved machine disclosed herein that the nuts which remain unshelled after they have passed the location of the paddle 34 and have been operated on thereby, are nuts whose shells were not cracked at all, or were improperly cracked, before being introduced into the machine. Such nuts pass from the interior of the drum through the aperture 13' of the end element 11 and are discharged into a suitable receptacle provided for their reception by the discharge chute 43. The baffle 34' prevents properly shelled nuts from being discharged into the chute 43.

The meats and shell fragments which are discharged through the spiral slot 22 of the drum into the discharge chute 51, move through the discharge passageway within the conduit structure 53 (Fig. 1) and fall on the inclined wall portion 54c and are guided by said wall portion to the lower portion of the conduit structure. Operation of the suction fan 58 causes a stream of air to flow upwardly through the open, lower portion of the conduit structure 53 and through the air duct 56 to and through the vertical air conduit 57, and the meats and shell fragments passing from the discharge passageway 52 are guided into this stream of air by the inclined wall portion 54c. The meats, being relatively heavy, will drop downwardly through the air stream into a receptacle (not shown) which will be disposed beneath the open lower end of the conduit structure 53, but the lighter shell fragments will be picked up by the upwardly moving stream of air and will be conducted through the air duct 56. When the junction of the air duct 56 and the vertical air conduit 57 is reached, the heavier shell fragments will fall out of the air stream and will pass through the conduit section 61 and into the member 63. The shell fragments which fall into the member 63 are conveyed by the screw conveyor 64 to the chamber 71, within the housing 70 of said member 63, and when the chamber is full additional incoming shell fragments will create internal pressure on pivoted cover element 72 which will swing the lower end thereof to an open position and permit the contents of the chamber to be discharged therefrom into a receptacle located beneath the housing 70. The stream of air which passes upwardly through the vertical air conduit 57 is discharged by the suction fan 58 into the dust collector 60, which is of well known construction, wherein the air and fine shell particles and dust are separated, the air passing out of the upper end of the dust collector and the fine shell particles and dust falling from the bottom of the dust collector into a receptacle therebeneath.

It is to be noted that the flow of air created by the suction fan 58 may be regulated by a quadrant regulator 73 of ordinary and well known construction. Also it is plain that air will be drawn into the housing 44 through the discharge passageway 52 and discharge chute 51 by the suction fan 46 which is associated with the discharge chute 45. Thus all dust produced within the housing 44 during operation of the machine will be effectively removed from said housing by the stream of air which moves through the machine housing to the suction fan 46.

During operation of the machine, meats, partially shelled nuts, and shell fragments may become lodged in the spiral slot 22 of the drum and therefore a cleaner plate 74 (Fig. 5) is provided to dislodge such nuts, meats, and shell fragments from said spiral slot. This cleaner plate is supported for swinging movement toward and from the circumferential face of the drum by an oscillatory bar 75 which is supported for movement by portions of the machine at opposite ends thereof. At the discharge end of the machine the bar 75 extends beyond the housing of the machine and has a handle 76 (Fig. 2) fixed to this extended portion of said bar. Normally the handle 76 hangs vertically so as to maintain the cleaner plate 74 in the position in which it is shown by full lines in Fig. 5, and when it is desired to dislodge from the spiral slot 22 of the drum nuts, meats, and shell fragments lodged therein, the lower end of the handle 76 is swung outwardly and upwardly in an arc of a circle to force the outer end portion of the cleaner plate in close contact with the circumferential face of the drum. The drum being rotated when the end portion of the cleaner plate is forced against its circumferential face, the meats and shell fragments will be dislodged by contact with the cleaner plate and will fall into the interior of the drum.

I claim:

1. A nut shelling machine comprising a frame, a drum supported for rotary movement by said frame and wherein cracked nuts to be shelled are subjected to tumbling action, means for rotating said drum, said drum having a spiral slot formed therein at its circumferential face through which nut meats and shell fragments which are separated during operation of the machine may pass from the interior of the drum to the exterior thereof, spiral means within said drum for feeding nuts and parts thereof longitudinally of the drum, said spiral means comprising a spiral web the turns of which are disposed wholly between adjacent turns of said spiral slot, rotating means within said drum adapted to strike nuts tumbled about therein to dislodge shell fragments from the meats of said nuts, and means for receiving nut meats and shell fragments discharged from the interior of said drum through said spiral slot.

2. A nut shelling machine comprising a frame, a drum supported for rotary movement by said frame and wherein cracked nuts to be shelled are subjected to tumbling action, means for rotating said drum, said drum having a spiral slot formed therein at its circumferential face through which nut meats and shell fragments which are separated during operation of the machine may pass from the interior of the drum to the exterior thereof, said spiral slot being relatively narrow at the portion of the drum where the nuts are introduced therein and being of greater widths as the opposite end of the drum is approached, spiral means within said drum for feeding nuts and parts thereof longitudinally of the drum, said spiral means comprising a spiral web the turns of which are disposed wholly between adjacent turns of said spiral slot, rotating means within said drum adapted to strike nuts tumbled about therein to dislodge shell fragments from the meats of said nuts, means for rotating said rotating means independently of said drum, and means for receiving nut meats and shell fragments discharged from the interior of said drum through said spiral slot.

3. A nut shelling machine comprising a frame, a drum supported for rotary movement by said frame and wherein cracked nuts to be shelled are subjected to tumbling action, means for rotating said drum, said drum having a spiral slot formed therein at its circumferential face through which nut meats and shell fragments which are separated during operation of the machine may pass from the interior of the drum to the exterior thereof, means within said drum for feeding nuts and parts thereof longitudinally of the drum, said means comprising a spiral web the turns of which are disposed wholly between adjacent turns of said spiral slot, inclined faces extended from said spiral web to said spiral slot, and means for receiving nut meats and shell fragments discharged from the interior of said drum through said spiral slot.

4. A nut shelling machine comprising a frame, a drum supported for rotary movement by said frame and wherein cracked nuts to be shelled are subjected to tumbling action, means for rotating said drum, said drum having a spiral slot formed therein at its circumferential face through which nut meats and shell fragments which are separated during operation of the machine may pass from the interior of the drum to the exterior thereof, means within said drum for feeding nuts and parts thereof longitudinally of the drum, said means comprising a spiral web the turns of which are disposed wholly between adjacent turns of said spiral slot, oppositely inclined faces extended from said spiral web to said spiral slot, and means for receiving nut meats and shell fragments discharged from the interior of said drum through said spiral slot.

LEO J. MEYER.